3,248,444
HYDROCARBON CONVERSION PROCESS AND
CATALYST THEREFOR
William G. Nixon, Clearwater, Fla., assignor to Universal Oil Products Company, Des Plaines, Ill., a corporation of Delaware
No Drawing. Filed Feb. 26, 1965, Ser. No. 435,732
13 Claims. (Cl. 260—671)

This application is a continuation-in-part of my copending application Serial No. 166,421, filed January 15, 1962, which is a continuation-in-part of my copending application Serial No. 55,852, filed September 14, 1960, both of said copending applications being now abandoned.

This invention relates to a process for the conversion of organic aromatic compounds and more particularly to a process for converting alkylatable aromatic compounds into more useful compounds. More specifically this invention is concerned with a conversion process for the position alkylation of an alkylatable aromatic compound with an olefin-acting compound utilizing a novel high surface area catalytic composition of matter.

On object of this invention is to produce specific alkylated aromatic hydrocarbons, and more particularly, to produce specific monoalkylated benzene hydrocarbons. Another object of this invention is a process for the production of ethylbenzene, a desired chemical intermediate, which ethylbenzene is utilized in large quantities in dehydrogenation processes for the manufacture of styrene, one of the starting materials for the production of resins and some synthetic rubber. Still another specific object of this invention is to produce specific alkylated aromatic hydrocarbons boiling within the gasoline boiling range having high anti-knock value and which may be used as such or as a component of gasoline suitable for use in automobile and airplane engines. A further specific object of this invention is a process for the production of specific cumene isomers by the position alkylation of benzene with propylene in the presence of a novel catalytic composition of matter. Another object of this invention is to provide a position alkylation process for the introduction of alkyl groups into aromatic hydrocarbons of high vapor pressure at normal conditions with minimum loss of said high vapor pressure aromatic hydrocarbons and maximum utilization thereof in the process utilizing a novel catalytic composition of matter.

In some prior art processes, low surface area (about 100 square meters per gram or less) sulfate-containing refractory oxide catalysts are said to be able to be employed in the alkylation of saturated branched-chain paraffins. Further, it is stated in these prior art processes that it is possible to carry out the alkylation of aromatics with olefins, such as the alkylation of benzene with propylene. However, such prior art processes fail to teach nor recognize whatever a position alkylation occurring with a change in operating temperature or pressure when utilizing a high surface area catalytic composite. I have discovered a position alkylation process wherein an aromatic compound and particularly an alkylatable aromatic compound may be converted to a specific and more useful compound by contacting said alkylatable aromatic compound with an olefin-acting compound in the presence of certain anhydrous high surface area catalytic compositions of matter at certain alkylation reaction conditions.

One embodiment of this invention resides in a conversion process for the position alkylation of an alkylatable aromatic compound with an olefin-acting compound at a temperature in the range of from about 0° to about 250° C. and at a pressure in the range of from about atmospheric to about 200 atmospheres in the presence of a catalytic composite of a sulfur- and oxygen-containing compound selected from the group consisting of metal sulfates and sulfites chemically bonded to an anhydrous solid support comprising a major portion of high surface area alumina selected from the group consisting of gamma-alumina, eta-alumina and theta-alumina.

Another embodiment of this invention resides in a conversion process for the position alkylation of benzene with an olefin at a temperature in the range of from about 0° to about 250° C. and at a pressure in the range of from about atmospheric to about 200 atmospheres in the presence of a catalytic composite of a sulfur- and oxygen-containing compound selected from the group consisting of metal sulfates and sulfites chemically bonded to an anhydrous refractory oxide support comprising a major portion of high surface area alumina selected from the group consisting of gamma-alumina, eta-alumina and theta-alumina.

Other objects and embodiments referring to alternative alkylatable aromatic compounds and to alternative catalytic compositions of matter will be found in the following further detailed description of the invention.

Examples of alkylatable aromatic compounds which may be converted according to the process of this invention include benzene, toluene, ortho-xylene, meta-xylene, para-xylene, ethylbenzene, ortho-ethyltoluene, meta-ethyltoluene, para-ethyltoluene, 1,2,3-trimethylbenzene, 1,2,4-trimethylbenzene, 1,3,5-trimethylbenzene, diethylbenzenes, triethylbenzenes, normal propylbenzene, isopropylbenzene, etc. Preferred alkylatable aromatic compounds are monocyclic aromatic hydrocarbons, that is, benzene hydrocarbons. Higher molecular weight alkyl aromatic hydrocarbons are also suitable. These include those aromatic hydrocarbons such as are produced by the alkylation of aromatic hydrocarbons with olefin polymers and are used as intermediates in the preparation of sulfonate surface-active agents. Such products are frequently referred to in the art as detergent alkylate, and include hexylbenzenes, nonylbenzenes, dodecylbenzenes, pentadecylbenzenes, hexyltoluenes, nonyltoluenes, dodecyltoluenes, pentadecyltoluenes, etc. Very often alkylate is obtained as a high boiling fraction in which the alkyl group attached to the aromatic nucleus varies in size from about $C_9$ to $C_{18}$. Other suitable aromatic hydrocarbons, which at specified alkylation conditions, depending upon the melting point of the aromatic chosen, would be in liquid form, would include those aromatic hydrocarbons with two or more aryl groups such as diphenyl, diphenylmethane, naphthalene, triphenyl, triphenylmethane, fluorene, stilbene, etc. Examples of other aromatic hydrocarbons utilizable within the scope of this invention which at specified alkylation conditions, depending upon melting point of the aromatic chosen, would be in liquid form, include those containing condensed aromatic rings. These include naphthalene, alkyl naphthalenes, anthracene, phenanthrene, naphthacene, rubrene, etc. Of the above-mentioned aromatic hydrocarbons that could be utilized in the process of this invention, the benzene hydrocarbons are preferred, and of the preferred benzene hydrocarbons, benzene itself is particularly preferred.

The olefin-acting compound, acting as the alkylating agent, may be selected from diverse materials including monoolefins, diolefins, polyolefins, acetylenic hydrocarbons, and also alcohols, ethers, and esters, the latter including alkyl halides, alkyl sulfates, alkyl phosphates, and various esters of carboxylic acids. The preferred olefin-acting compounds are olefinic hydrocarbons which comprise mono-olefins containing one double bond per molecule and polyolefins which contain more than one double bond per molecule. Mono-olefins which are utilized as olefin-acting compounds in the process of the present invention are either normally gaseous or normally liquid olefins such as the various pentenes, hexenes, 2-butene, isobutylene and higher molecular weight normally liquid olefins such as various pentenes, hexenes, heptenes, octenes, and mixtures thereof, and still higher molecular weight liquid olefins, the latter including various olefins polymers having from about 9 to about 18 carbon atoms per molecule inculuding propylene trimer, propylene tetramer, propylene pentamer, etc. Cyclo olefins such as cyclopentene, methylcyclopentene, cyclohexene, methylcyclohexene, etc., may also be utilized. Also included within the scope of the olefin-acting compound are certain substances capable of producing olefinic hydrocarbons or intermediates thereof under the conditions of operation utilized in the process. Typical olefin-producing substances or olefin-acting compounds capable of use include alkyl halides capable of undergoing dehydrohalogenation to form olefinic hydrocarbons and thus containing at least two carbon atoms per molecule. Examples of such alkyl halides include ethyl fluoride, n-propyl fluoride, isopropyl fluoride, n-butyl fluoride, isobutyl fluoride, sec-butyl fluoride, tert-butyl fluoride, etc.; ethyl chloride, n-propyl chloride, isopropyl chloride, n-butyl chloride, isobutyl chloride, sec.-butyl chloride, tert-butyl chloride, etc., ethyl bromide, n- propyl bromide, isopropyl bromide, n-butyl bromide, isobutyl bromide, sec-butyl bromide, tert-butyl bromide, etc. As stated hereinabove, other esters such as alkyl sulfates including ethyl sulfate, propyl sulfate, etc., and alkyl phosphates including ethyl phosphates, etc., may be utilized. Ethers such as diethyl ether, ethyl propyl ether, dipropyl ether, etc., are also included within the generally broad scope of the term olefin-acting compound and may be successfully utilized as alkylating agents in the process of this invention.

In addition, the process of this invention may be successfully applied to and utilized for complete conversion of olefin hydrocarbons when these olefin hydrocarbons are present in minor quantities in various gas streams. Thus, the normally gaseous olefin for use in the process of this invention need not be concentrated. Such normally gaseous olefin hydrocarbons appear in minor quantities in various refinery gas streams, usually diluted with gases such as hydrogen, nitrogen, methane, ethane, propane, etc. These gas streams containing minor quantities of olefin hydrocarbons are obtained in petroleum refineries from various refinery installations including thermal cracking units, catalytic cracking units, thermal reforming units, coking units, polymerization units, dehydrogenation units, etc. Such refinery gas streams have in the past often been burned for fuel value, since an economical process for the utilization of their olefin hydrocarbon content has not been available. This is particularly true for refinery gas streams known as off-gas streams containing relatively minor quantities of olefin hydrocarbons such as ethylene, propylene, etc.

As hereinbefore set forth, the invention is concerned with a conversion process for the position alkylation of alkylatable aromatic compounds, said process being effected in the presence of a high surface area catatlyst which possesses a high degree of hydrocarbon conversion activity and is particularly effective as a position alkylation catalyst for the alkylatable aromatic compounds hereinabove set forth. The catalyst comprises an oxide of sulfur composited on and chemically bonded to a substantially anhydrous refractory oxide support comprising a major portion of high surface area alumina. However, not every refractory oxide support can be utilized as a satisfactory support for disposal of an oxide of sulfur thereon. The particular refractory oxide support which is to be utilized should possess a relatively high surface area and be relatively or substantially free from water. In most cases this freedom from water of the support is achieved by a precalcination treatment of said support. This precalcination is carried out at a relatively high temperature in the range of from about 400° to about 700° C. and for a time sufficient to effect substantial removal of adsorbed or combined water from the support. The time required for the dehydration will vary depending upon the support, and in addition, will depend upon whether the water is in a combined or in merely a physically adsorbed form. As hereinbefore set forth, the support is characterized by having a high surface area. By the term high surface area is meant the surface area of the support measured by surface adsorption tchniques within the range of from about 25 to about 500 or more square meters per gram and preferably a support having a surface area greater than 100 square meters per gram. For example, it has been found that certain low surface area supports such as alpha-alumina which is obviously free from combined water and which has been freed from adsorbed water is not a satisfactory support for the oxides of sulfur in the preparation of catalysts for use in the process of this invention. Alpha-alumina is usually characterized by a surface area ranging from about 10 to about 25 square meters per gram. In contrast, gamma- alumina which has a surface area ranging from greater than about 100 square meters per gram to about 300 square meters per gram, and which has been freed from adsorbed water and which contains little combined water, is a satisfactory support. Celite, a naturally occurring mineral, after precalcination, is not a satisfactory support. Celite has a surface area of from about 2 to about 10 square meters per gram. In addition, aluminas which contain combined water but which have relatively high surface areas are also not satisfactory supports. Such aluminas include dried alumina mono-hydrates which have not been sufficiently calcined to remove combined water and to form gamma-alumina. These alumina hydrates may have surface areas ranging from about 50 to about 200 square meters per gram but because they contain combined water are not satisfactory supports. Particularly preferred supports for the preparation of catalysts for use in the process of this invention include high surface area crystalline alumina modifications such as gamma-, eta- and theta-alumina, although these are not necessarily of equivalent suitability. However, as is obvious from the above discussion, the limitation on the use of any particular support is one of freedom from combined or adsorbed water in combination with the high surface area of the support selected. In addition to the aforementioned high surface area gamma-, eta- and theta-aluminas which may be utilized as solid supports, it is also contemplated that other refractory oxides may be combined with said high surface area aluminas such as silica, magnesia, silica-magnesia, thoria, zirconia, etc., so long as the refractory oxide support comprises a major portion of the high surface area alumina.

Oxides of sulfur which are composited on and chemically combined with the high surface area solid supports hereinabove set forth include metallic oxides of sulfur in which the metallic portion of the compound preferably comprises a metal of Group VIB of the Periodic Table, a metal of the Iron Group of Group VIII, as well as aluminum, etc., such as aluminum sulfate, nickel sulfate, nickel sulfite, chromium sulfate, chromium sulfite, molybdenum sulfate, tungsten sulfate, cobalt sulfate, cobaltous sulfite, ferric sulfate, ferric sulfite, etc. In addition to the hereinabove enumerated metallic oxides of sulfur it is also contemplated within the scope this invention that a refractory oxide support may be impregnated with a solution of ammonium sulfate or ammonium sulfite, or, if so desired, with a solution of dilute sulfuric or dilute sulfurous acid followed by the addition of a sufficient amount of ammonium hydroxide to render the composite alkaline in nature. Following the impregnation, the support is then calcined thereby driving off the ammonia and allowing the oxide of sulfur to remain impregnated on and chemically bonded to the refractory oxide support. The evolution of the ammonia is thought to be due to the reaction of the oxide of sulfur with residual hydroxyl groups on the refractory oxide support, the major portion of which is a high surface area alumina. Regardless of whether or not this is so, the catalyst comprises an oxide of sulfur chemically adsorbed on the surface thereof, and as hereinbefore set forth, it is the particular association of these components which results in the unusual catalytic properties of this high surface area catalyst.

The addition of the oxide of sulfur to the refractory oxide support which comprises a major portion of high surface area alumina will enhance the surface-area characteristics of the support. Surface-area characteristics are defined as the surface area, expressed as square meters per gram; pore volume, expressed as cubic centimeters per gram; and pore diameter expressed in angstrom units (A.). As hereinbefore set forth, certain forms of alumina which possess the desired high surface area characteristics are utilized either as the major component or as the refractory oxide support itself for the catalyst of this invention. The base alumina may be prepared by any of the well known suitable means of manufacture, one example of which is the addition of an alkaline reagent to a salt of aluminum in an amount sufficient to form aluminum hydroxide, which, upon drying and calcining, is converted to a high surface area alumina. Similarly, if the refractory oxide support comprises both a major portion of high surface area alumina and a minor portion of, for example, silica, these components may be prepared by separate, successive or coprecipitate means.

The catalyst which is utilized in the process of the present invention may be prepared by many methods. For example, a high surface area refractory oxide base previously prepared by the methods hereinbefore set forth is then combined with an oxide of sulfur by conventional means such as treating the base with a solution of said oxide of sulfur, said oxide of sulfur being added in an amount sufficient to allow the finished catalyst to contain from about 0.5 to about 15% or more by weight of sulfate or sulfite. Following this, the combined material is then dried by air oxidation in a furnace tube or muffle furnace, etc. The finished catalyst comprising the oxide of sulfur composited on and chemically combined with the high surface area refractory oxide support is then utilized as the conversion catalyst, and especially as a position alkylation catalyst.

The process of this invention utilizing the high surface area catalyst hereinbefore set forth may be effected in any suitable manner and may comprise either a batch or continuous type operation. The preferred method by which the process of this invention may be effected is a continuous type operation. One particular method is the fixed bed operation in which the alkylatable aromatic compound and the olefin-acting compound are continuously charged to a reaction zone containing a fixed bed of the desired high surface area catalyst, said zone being maintained at the proper operating conditions of temperature and pressure, that is, a temperature in the range of from about 0° to about 250° C., or more, and a pressure in the range of from about atmospheric to about 200 atmospheres or more. The catalyst is suitable for either gas phase or liquid phase reactions so that the liquid hourly space velocity (the volume of charge per volume of catalyst per hour) may be maintained in the reaction zone in the range of from about 0.1 to about 20 or more, and preferably in a range of from about 0.1 to about 10, or at a gaseous hourly space velocity in a range of from about 100 to about 1500 or more. The reaction zone may comprise an unpacked vessel or coil or may be lined with an adsorbent packing material. The two reactants may be charged through separate lines or, if so desired, may be admixed prior to entry into said reaction zone and charged thereto in a single stream. This charge passes through the catalyst bed in either an upward or downward flow and the alkylated product is continuously withdrawn, separated from the reactor effluent, and recovered, while any unreacted starting materials may be recycled to form a portion of the feed stock. It is also contemplated within the scope of this invention that reaction gases such as hydrogen, nitrogen, oxygen, air, etc., may also be charged to the reaction zone if desired. Another continuous type operation comprises the moving bed type in which the reactants and the catalyst bed move either concurrently or countercurrently to each other while passing through said reaction zone. Yet another continuous type of operation which may be used is the slurry type in which the high surface area catalyst is carried into the reaction zone as a slurry in one or the other of the reactants.

Still another type of operation which may be used is the batch type operation in which a quantity of the alkylatable aromatic compound, the olefin-acting compound and the catalyst are place in an appropriate apparatus such as, for example, a rotating or stirred autoclave or an alkylation flask. The apparatus is then heated to the desired temperature and maintained thereat for a predetermined residence time at the end of which time the flask and contents thereof are cooled to room temperature and the desired reaction product is recovered by conventional means such as, for example, by washing, drying, fractional distillation, crystallization, etc.

It is also contemplated within the scope of this invention that the high surface catalyst of the present invention may be utilized for promoting miscellaneous organic reactions, said high surface area catalyst being employed in essentially the same way as when used for alkylating alkylatable aromatic compounds. Typical cases of reactions in which the present type of high surface area catalyst may be used include the polymerization of olefinic hydrocarbons such as butylenes, etc.; the alkylation of cyclic compounds with olefins, the cyclic compounds including aromatics, polycyclic compounds, naphthenes, and phenols; condensation reactions such as those occurring between ethers and aromatics, alcohols and aromatics, phenols and aldehydes, etc.; reaction involving the hydrohalogenation of unsaturated organic compounds; isomerization reactions in which the double bond of an olefinic hydrocarbon may be shifted to a more centralized position in the chain or in which the carbon skeleton arrangement of the compound may undergo rearrangement; ester formation by the interatcion of carboxylic acids and olefins; and the like. The specific procedures for utilizing the present type of high surface area catalyst in miscellaneous organic reactions will be determined by the chemical and physical characteristics and the phase of the reaction constituents.

The following examples are given to illustrate the process of the present invention which, however, are not intended to limit the generally broad scope of the present invention in strict accordance therewith.

*Example I*

An 80% alumina-20% zirconia high surface area catalyst support in pill form is prepared and composited with a 20% solution of aluminum sulfate. The composite is then treated in a furnace tube with a stream of air while being slowly heated to a temperature of about 500° C. The composite is maintained at this temperature for a period of about 0.5 hour. The finished catalyst is found to have a surface area in excess of 150 square meters per gram and contains about 10 weight percent sulfate. This catalyst is designated as catalyst "A."

*Example II*

A catalyst similar to that set forth in Example I is prepared by compositing a cobalt sulfate solution with a refractory oxide base comprising high surface area alumina spheres. The resulting composite is then placed in a muffle furnace or tube furnace and is slowly heated to a temperature of about 500° C.; upon reaching this temperature the catalyst is air oxidized for an additional period of about 1 hour. This catalyst is designated as catalyst "B."

*Example III*

Another catalyst similar to that described in Example I is prepared by admixing a 20% molybdenum sulfate solution with high surface area alumina spheres following which the resultant composite is treated in a manner similar to that set forth in the above examples, that is, by being placed in a furnace tube and air oxidized at a temperature of about 500° C. for a period of about 1 hour. The catalyst is designated as catalyst "C."

*Example IV*

The high surface catalyst prepared according to Example I above and designated as catalyst "A" is utilized in an alkylation reaction to determine the alkylation activity of said catalyst. In this experiment, 10 grams of the catalyst prepared according to Example I is placed in an appropriate apparatus which is provided with heating means. In the experiment, benzene and ethylene are charged separately to the alkylation zone. The reactor is maintained at about 450 p.s.i.g. and 100° C. Substantially complete conversion of the ethylene is obtained. The product is analyzed for olefins using a mass spectrometer and it is found that the product comprises ethylbenzene, diethylbenzene, polyethylbenzenes, toluene and unreacted benzene.

*Example V*

A portion of the high surface area catalyst prepared according to the method set forth in Example II above and designated as catalyst "B" is also utilized in an alkylation reaction, the conditions and apparatus being similar to that described in Example IV above. Based on weight, substantially complete conversion of the ethylene is obtained. The product is analyzed for olefins using a mass spectrometer and it is found that the product comprises ethylbenzene, diethylbenzene, polyethylbenzenes, toluene and unreacted benzene.

*Example VI*

A portion of the high surface area catalyst prepared according to Example III and designated as catalyst "C" is utilized in an alkylation reaction, 20 grams of the finished catalyst being placed in an alkylation apparatus. In the experiment, benzene and propylene are charged separately to the alkylation zone. The reactor is maintained at about 500 p.s.i.g. and 100° C. Substantially complete conversion of the propylene is obtained. The product is analyzed for olefins using a mass spectrometer and it is found that the product comprises cumene, diisopropylbenzenes, polypropylbenzenes, and unreacted benzene.

*Example VII*

In this example, the catalyst is prepared by compositing 500 cc. of high surface area alumina spheres with aluminum sulfate following which the composite is air oxidized at a temperature of 500° C. using 2000 cc. of air per minute for about 4 hours.

In the experiment, 50 cc. of this catalyst is placed in an alkylation apparatus. A toluene-propylene feed mixture having about a 10/1 mol ratio of toluene to propylene is prepared and charged to the alkylation zone. After 3 hours of operation at 500 p.s.i.g. and 44° C., a sample of the product is taken for analysis. This sample is designated as sample "a." The catalyst temperature is then increased to 72° C. and after 4 hours, a product sample designated as sample "b" is taken. At this point, the catalyst temperature is increased to 155° C. and after 2 hours, product sample "c" is taken. The alkylation zone is then purged utilizing a nitrogen sweep at 155° C. for 2 hours. The catalyst temperature is then decreased to 44° C. and the toluene-propylene feed mixture is again charged to the alkylation zone. After about 2½ hours at 44° C. and 500 p.s.i.g., product sample "d" is taken. The catalyst temperature is then increased to 100° C. and after 2 hours at this temperature, using the same feed rate and plant pressure, product sample "e" is taken.

The total toluene-cymene product analysis is determined by gas-liquid chromatography and this data is presented in Table I. As shown in Table I, the propylene alkylation of toluene proceeds at low temperatures and essentially complete conversion of the propylene is obtained. A definite trend for decreasing o-cymene production is evident when the catalyst operating temperature is increased to above about 100° C. It is believed that water from the feed probably collects on the catalyst during the first part of the experiment and, during sample period "c" at 155° C., this water is removed. The decline in o-cymene production then occurs due to the increased selectivity of the catalyst for position alkylation. In the second part of the experiment after the catalyst is dried in situ as hereinbefore set forth, only a trace of o-cymene is produced at 100° C. (sample "e") whereas 21% of o-cymene is obtained at 44° C. (sample "d").

A low bromine index of 5.5 of sample "e" indicates that the cymene product contains very little unsaturated product and that no olefinic polymer is produced by the possible polymerization of propylene.

TABLE I

| Sample | a | b | c | d | e |
|---|---|---|---|---|---|
| Catalyst Temperature, ° C | 44 | 72 | 155 | 44 | 100 |
| Products, area, percent: | | | | | |
| Toluene | 91.4 | 88.9 | 87.8 | 92.0 | 88.8 |
| m-Cymene | 1.8 | 2.3 | 7.0 | 2.6 | 8.5 |
| p-Cymene | 4.6 | 5.9 | 4.2 | 3.7 | 2.7 |
| o-Cymene | 2.2 | 2.9 | 1.0 | 1.7 | Trace |
| Product distribution, area, percent: | | | | | |
| m-Cymene | 21 | 21 | 57 | 33 | 76 |
| p-Cymene | 54 | 53 | 34 | 46 | 24 |
| o-Cymene | 25 | 26 | 9 | 21 | Trace |

*Example VIII*

In this example, a second portion of the catalyst prepared according to Example VII is utilized in the alkylation of benzene with propylene. Fifty cc. of this catalyst is placed in an alkylation apparatus and nitrogen swept at 150° C. for 2 hours. The catalyst is then cooled to 44° C. A benzenepropylene feed mixture having a 10/1 mol ratio of benzene to propylene is prepared and charged to the alkylation zone. After 3 hours of operation at 500 p.s.i.g. and 44° C., a sample of the product is taken for analysis. This sample is designated as sample "f" and includes benzene, cumene, and diisopropylbenzenes. Five additional samples are taken using the same catalyst, plant pressure and feed rate. The sample periods were conducted in the following order: "g" at 78° C., "h" at 100° C., "i" at 125° C., "j" at 78° C. and "k" at 100° C. The catalyst is operated for 2 to 3 hours at each of these temperatures before a sample of the product is collected for analysis. Final sample period "l" on this same catalyst is made at 200 p.s.i.g. and at a catalyst temperature of 100° C.

The total benzene-cumene product analysis is determined by gas-liquid chromatography and this data is presented in Table II. As shown in Table II, the propylene alkylation of benzene proceeds at low temperatures and essentially complete conversion of the propylene is obtained. The data in Table II indicates that as the catalyst temperature is increased from 44° C. to 100° C., the production of diisopropylbenzenes decreases. Accompanied with this decrease is the disappearance of the o-diisopropylbenzene. This position alkylation is verified by consecutively testing the catalyst at 125° C., 78° C., and then at 100° C. At both 125° C. and 100° C. only trace amounts of o-diisopropylbenzene are produced, whereas during intermediate sample period "j" at 78° C., 11.2% of o-diisopropylbenzene is present in the total diisopropylbenzene product. Sample period "l" shows the effect obtained by decreasing the pressure from 500 p.s.i.g. to 200 p.s.i.g. while operating at 100° C. This sample indicates that at lower pressure the cumene production decreases and that o-diisopropylbenzene appears.

A bromine index of 2.3 is obtained on the product from both sample periods "k" and "l" which are operated at 100° C. at operating pressures of 500 and 200 p.s.i.g., respectively. This again indicates very little unsaturated product is present in the product.

TABLE II

| Sample period | f | g | h | i | j | k | l |
|---|---|---|---|---|---|---|---|
| Catalyst temperature, °C | 44 | 78 | 100 | 125 | 78 | 100 | 100 |
| Pressure, p.s.i.g | | | 500 | | | | 200 |
| Products, area, percent: | | | | | | | |
| Benzene | 83.3 | 82.0 | 85.5 | 87.5 | 89.8 | 87.0 | 88.8 |
| Cumene | 12.0 | 13.9 | 14.0 | 12.2 | 8.8 | 12.2 | 9.7 |
| Diisopropylbenzenes | 5.7 | 4.1 | 0.5 | 0.3 | 1.4 | 0.8 | 1.5 |
| Diisopropylbenzenes, product distribution, area, percent: | | | | | | | |
| Meta- | 31.4 | 40.6 | 64.3 | 66.1 | 49.6 | 67.0 | 52.8 |
| Para- | 44.3 | 41.6 | 35.7 | 33.9 | 39.2 | 33.0 | 38.2 |
| Ortho- | 24.3 | 18.0 | Trace | Trace | 11.2 | Trace | 9.0 |

I claim as my invention:

1. A conversion process for the position alkylation of an alkylatable aromatic compound which comprises reacting said compound with an olefin-acting compound at a temperature in the range of from about 0° to about 250° C. and at a pressure in the range of from about atmospheric to about 200 atmospheres in the presence of a catalytic composite consisting essentially of a sulfur- and oxygen-containing compound selected from the group consisting of sulfates of aluminum, nickel, chromium, molybdenum, tungsten, cobalt and iron and sulfites of nickel, chromium, cobalt and iron chemically bonded to an anhydrous solid support comprising a major portion of high surface area alumina selected from the group consisting of gamma-alumina, eta-alumina and theta-alumina.

2. A conversion process for the position alkylation of an alkylatable aromatic compound which comprises reacting said compound with an olefin-acting compound at a temperature in the range of from about 0° to about 250° C. and at a pressure in the range of from about atmospheric to about 200 atmospheres in the presence of a catalytic composite consisting essentially of a sulfur- and oxygen-containing compound selected from the group consisting of sulfates of aluminum, nickel, chromium, molybdenum, tungsten, cobalt and iron and sulfites of nickel, chromium, cobalt and iron chemically bonded to an anhydrous refractory oxide support comprising a major portion of high surface area alumina selected from the group consisting of gamma-alumina, eta-alumina and theta-alumina.

3. The process of claim 2 further characterized in that said sulfur- and oxygen-containing compound is aluminum sulfate.

4. The process of claim 2 further characterized in that said sulfur- and oxygen-containing compound is cobalt sulfate.

5. The process of claim 2 further characterized in that said sulfur- and oxygen-containing compound is molybdenum sulfate.

6. The process of claim 2 further characterized in that said alkylatable aromatic compound is an alkylatable aromatic hydrocarbon.

7. The process of claim 2 further characterized in that said alkylatable aromatic compound is a benzene hydrocarbon.

8. The process of claim 2 further characterized in that said olefin-acting compound is an olefinic hydrocarbon.

9. The process of claim 2 further characterized in that said olefin-acting compound is a normally gaseous olefin.

10. A conversion process for the position alkylation of benzene which comprises reacting the benzene with an olefin at a temperature in the range of from about 0° to about 250° C. and at a pressure in the range of from about atmospheric to about 200 atmospheres in the presence of a catalytic composite consisting essentially of a sulfur- and oxygen-containing compound selected from the group consisting of sulfates of aluminum, nickel, chromium, molybdenum, tungsten, cobalt and iron and sulfites of nickel, chromium, cobalt and iron chemically bonded to an anhydrous refractory oxide support comprising a major portion of high surface area alumina selected from the group consisting of gamma-alumina, eta-alumina and theta-alumina.

11. The process of claim 10 further characterized in that said olefin is ethylene.

12. The process of claim 10 further characterized in that said olefin is propylene.

13. The process of claim 10 further characterized in that said olefin is butylene.

References Cited by the Examiner

UNITED STATES PATENTS

| 2,355,868 | 8/1944 | Jean | 260—683.15 |
| 2,939,890 | 6/1960 | Hervert et al. | 260—671 |
| 3,032,599 | 5/1962 | Holm et al. | 260—683.65 |

DELBERT E. GANTZ, *Primary Examiner.*

C. R. DAVIS, *Assistant Examiner.*